United States Patent [19]

Kuroiwa

[11] Patent Number: 5,006,865

[45] Date of Patent: Apr. 9, 1991

[54] METHOD OF RECORDING GRADATION IMAGE IN THERMAL PRINTER

[75] Inventor: Yoshihiko Kuroiwa, Nagano, Japan

[73] Assignees: Fuji Photo Film Co., Kanagawa; Nagano Nihon Musen K.K., Nagano, both of Japan

[21] Appl. No.: 340,816

[22] Filed: Apr. 20, 1989

[30] Foreign Application Priority Data

Apr. 20, 1988 [JP] Japan .................................. 63-97708

[51] Int. Cl.[5] .............................................. G01D 15/10

[52] U.S. Cl. ................................ 346/76 PH; 358/298; 400/120

[58] Field of Search ........................... 346/76 PH, 1.1; 358/298; 400/120

[56] References Cited

U.S. PATENT DOCUMENTS 4,806,949 2/1989 Onuma et al. ........................ 358/298

FOREIGN PATENT DOCUMENTS 0130379 10/1981 Japan .................................. 400/120

0117772 7/1983 Japan ............................. 346/76 PH

*Primary Examiner*—Benjamin R. Fuller

*Assistant Examiner*—Huan Tran

*Attorney, Agent, or Firm*—Sughrue, Mion, Zinn, Macpeak & Seas

[57] ABSTRACT

A gradation image is recorded on a thermosensitive medium with heating elements in a thermal printer by generating first pulse signals each for forming a one-gradation image and second pulse signals each for forming a plural-gradation image from an image signal, and energizing the heating elements with the first and second pulse signals which are combined together to record a gradation image with the one-gradation image as a minimum density unit thereof.

9 Claims, 8 Drawing Sheets

METHOD OF RECORDING GRADATION IMAGE IN THERMAL PRINTER

BACKGROUND OF THE INVENTION

The present invention relates to a method of recording a gradation image in a thermal printer, and more particularly to a method of recording a gradation image on a thermosensitive medium with heating elements by energizing the heating elements with a combination of pulse signals each corresponding to a one-gradation image and pulse signals each corresponding to a plural-gradation image, so that the image can be recorded accurately at a high speed.

Various imaging apparatus such as conventional X-ray photographing apparatus, ultrasonic imaging apparatus, X-ray CT (Computerized Tomography) and DF (Digital Fluorography) apparatus, for example, are finding widespread use for medical applications for diagnosis or the like. In such a medical image diagnostic apparatus, ultrasonic energy, X-rays, or the like is applied to the body of a patient to produce an image of a local region of the body to be diagnosed, and the produced image is displaced as a visible image on a CRT motor, for example. A doctor or the like then diagnose the local region by observing the displayed image. Since the local region of the patient's body and, if desired, other local regions thereof can easily be observed, the diagnostic procedure can accurately and quickly be performed.

It is desirable to selectively record displayed images permanently on recording mediums to provide hard copies. A variety of printers have been proposed to make such hard copies. As an example, there is known a thermal printer which employs a light-fixable thermosensitive film that will develop a color in the pattern of an image to be recorded upon application of heat and fix the image when exposed to ultraviolet radiation.

The thermal printer has a thermal head comprising an array of heating elements oriented in a main scanning direction perpendicularly to an auxiliary scanning direction along which the light-fixable thermosensitive film is fed. An image signal supplied from the medical image diagnostic apparatus is applied to the thermal head to record a desired image on the light-fixable thermosensitive film. Then, the recorded image is fixed to the light-fixable thermosensitive film by exposure to ultraviolet radiation emitted from an ultraviolet lamp in an image fixing unit.

The light-fixable thermosensitive film develops an image density dependent on the period of time in which the film is heated by the thermal head, i.e., the amount of thermal energy applied to the film, as shown in FIG. 1 of the accompanying drawings. The thermal printer can therefore record an image of a desired density by adjusting the period of time in which the film is heated by the heating elements, based on the density vs. energy curve illustrated in FIG. 1.

One method of recording a gradation image on a light-fixable thermosensitive film with heating elements comprises energizing heating elements with as many pulse signals as the number of image gradations to heat the light-fixable thermosensitive film. According to this recording method, however; since as many pulse signals as the number of image gradations must be transferred to each of the heating elements, a long interval of time is required to transfer the pulse signal data, and the time needed to record the image is long. Between pulse signals to be transferred to each heating element, there are produced as many time zones in which the heating element remains de-energized as the number of image gradations. The temperature of the heating element is varied in those time zones, lowering the efficiency of color development on the light-fixable thermosensitive film.

There is another method of forming an image with one pulse signal for one pixel by adjusting the time duration of the pulse signal for energizing a heating element dependent on an image gradation to be reproduced. With such a method, pulse signals having pulse durations corresponding to respective image gradations have to be applied to the respective heating elements. This method also requires a long period of time to record a desired image. Because the temperature of each heating elements varies between pulse signals applied, the efficiency of color development on the light-fixable thermosensitive film is also lowered.

SUMMARY OF THE INVENTION

It is a major object of the present invention to provide a method of recording a gradation image of high resolution on a thermosensitive medium accurately at a high speed in a thermal printer by energizing heating elements with a combination of pulse signals each corresponding to a one-gradation image and pulse signals each corresponding to a plural-gradation image.

Another object of the present invention is to provide a method of recording a gradation image on a thermosensitive medium in a thermal printer with heating elements, comprising the steps of: generating first pulse signals each for forming a one-gradation image and second pulse signals each for forming a plural-gradation image from an image signal; and energizing the heating elements with said first and second pulse signals which are combined together to record a gradation image with said one-gradation image as a minimum density unit thereof.

Still another object of the present invention is to provide the method wherein said first pulse signals include a first unit pulse signal and a second unit pulse signal, said method further comprising the steps of: energizing said heating elements with said first unit pulse signal; then energizing said heating elements with said second pulse signals; and thereafter energizing said heating elements with said second unit pulse signal.

Yet another object of the present invention is to provide the method further comprising the step of: adjusting the time duration of said second unit pulse signal with respect to the time duration of said first unit pulse signal to adjust the density of the gradation image recorded on said thermosensitive medium.

A further object of the present invention is to provide the method wherein said first pulse signals are generated based on low-order bit data of the image signal.

A still further object of the present invention is to provide the method wherein said second pulse signals are generated based on other bit data than low-order bit data of the image signal.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
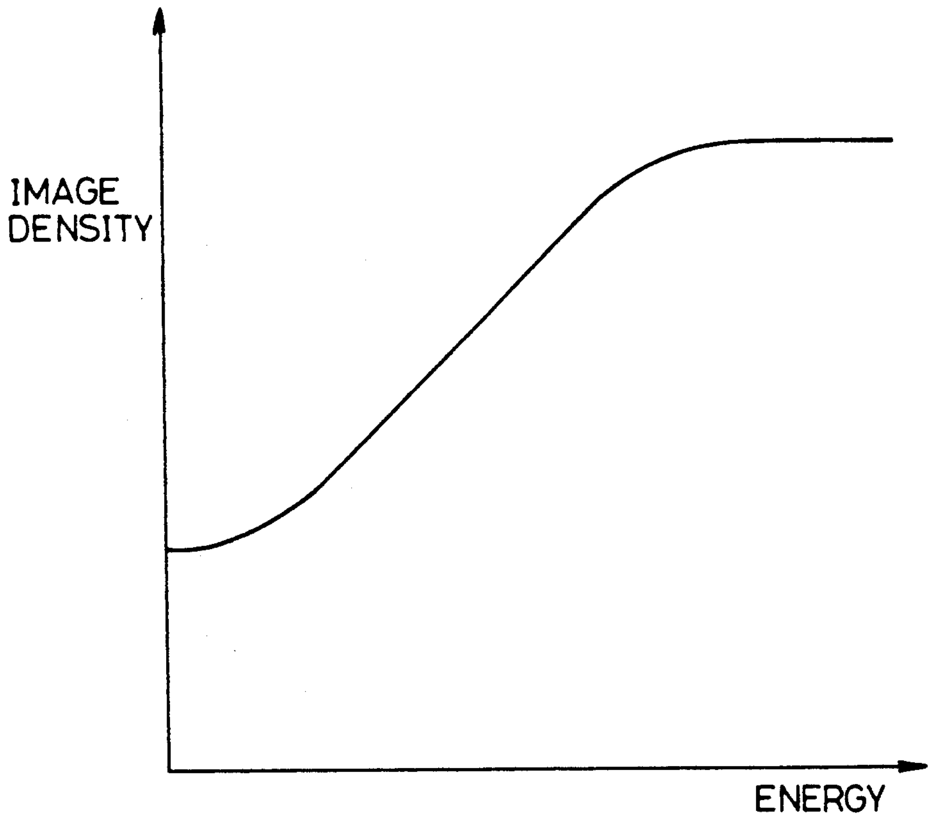
FIG. 1 is a graph showing the relationship between thermal energy applied to thermosensitive medium and the density of an image recorded on the thermosensitive medium by the applied thermal energy.
Figure 2:
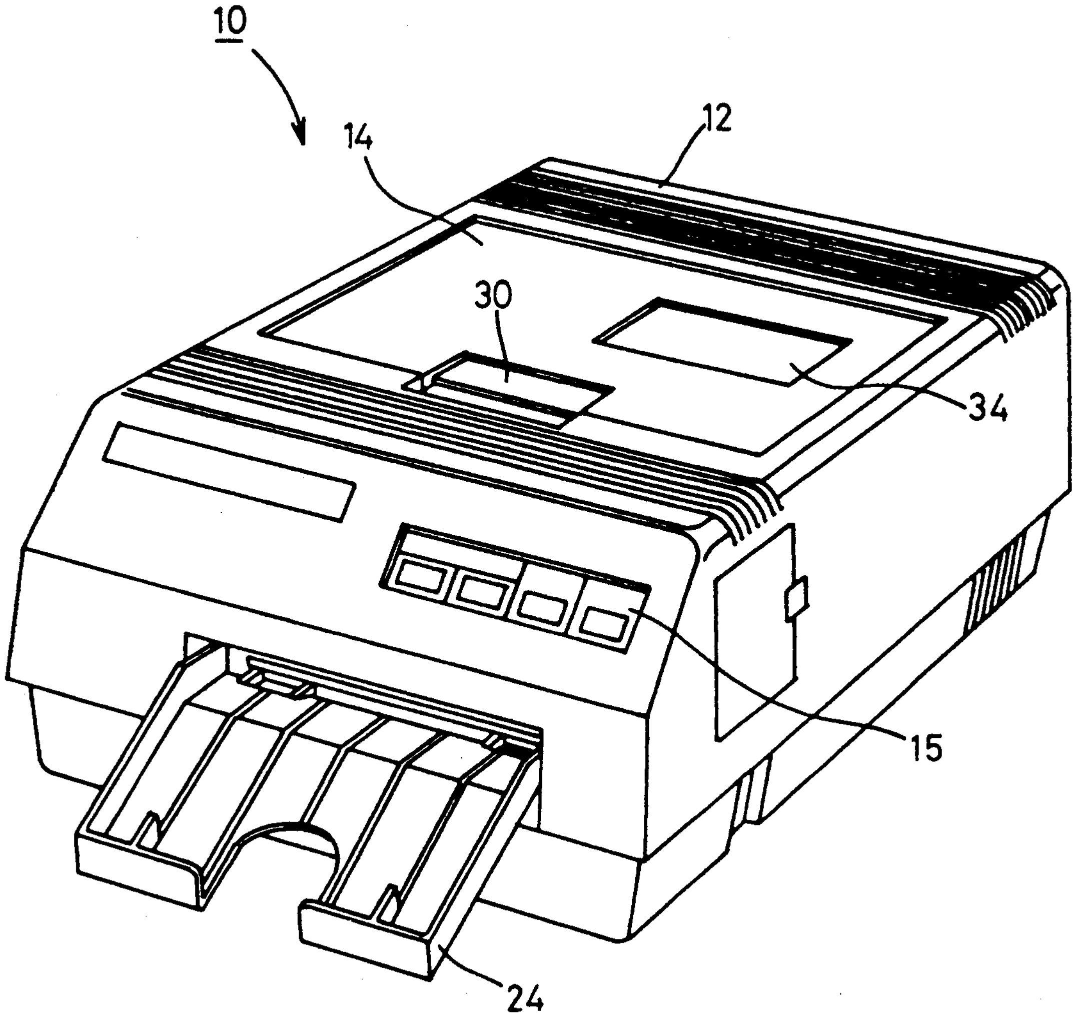
FIG. 2 is a perspective view of a thermal printer in which a recording method of the present invention is carried out.
Figure 3:
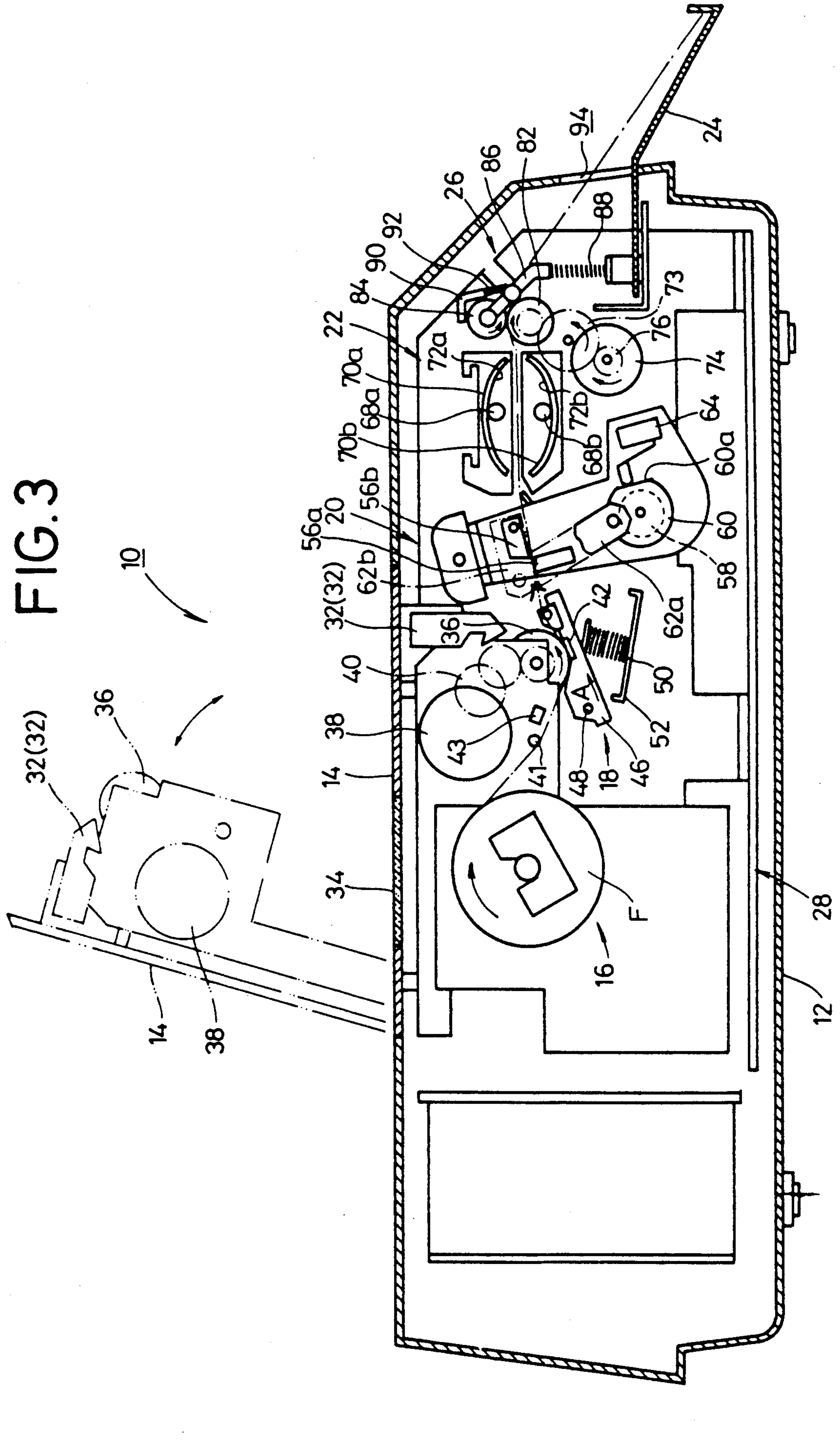
FIG. 3 is a vertical cross-sectional view, partly omitted from illustration, of the thermal printer shown in FIG. 2.

FIG. 2 shows a thermal printer, generally designated by the reference numeral 10, in which a gradation image recording method of the present invention will be carried out. The thermal printer 10 includes a casing 12 and a cover 14 openably and closably mounted at a pivoted end thereof on the upper pate of the casing 12. An operation panel 15 for operating the thermal printer 10 is disposed on the front panel of the casing 12. As shown in FIG. 3, the casing 12 houses a film loading unit 16 for storing coiled light-fixable thermosensitive film F as an image recording medium having a polyester base, an image recording unit 18 for heating the light-fixable thermosensitive film F to form an image thereon, a cutter unit 20 for cutting off the light-fixable thermosensitive film F to a prescribed length, an image fixing unit 22 for applying ultraviolet radiation to the light-fixable thermosensitive film F to fix the image thereon, a discharge unit 26 for discharging the cut length of the light-fixable thermosensitive film F onto a tray 24, and a control unit 28 for controlling the units 16, 18, 20, 22, and 26.

The light-fixable thermosensitive film F may be in the form of any of various sheet-like mediums such as a film, a sheet, a web, or the like of a suitable material.

Figure 4:
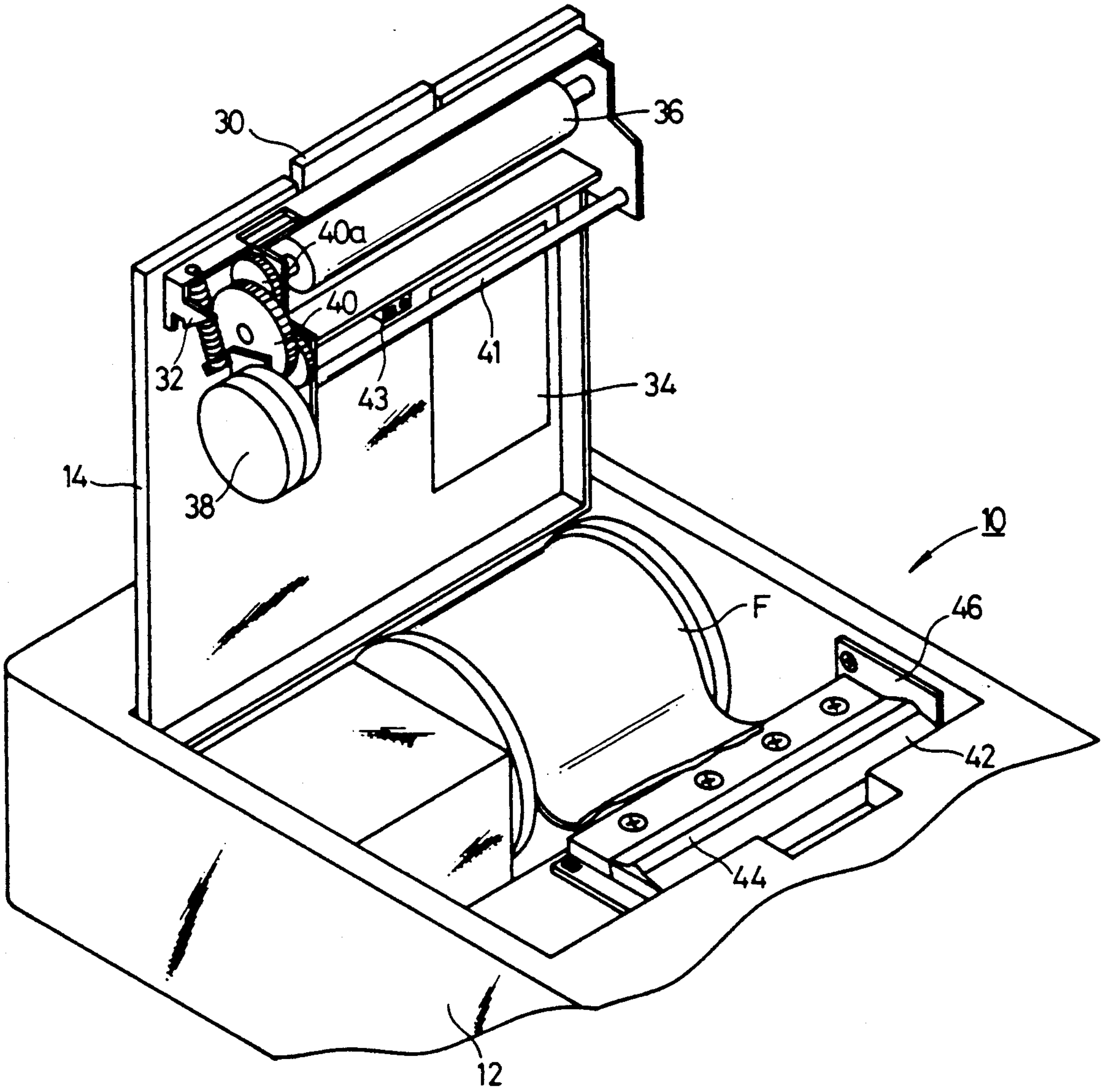
FIG. 4 is a fragmentary perspective view of the thermal printer shown in FIG. 2.

A grip 30 is attached to the other end of the cover 14. By pulling the grip 30 upwardly, latch fingers 32 on the opposite sides of the cover 14 are turned out of engagement with the casing 12 to allow the cover 14 to be opened as shown in FIG. 4. The cover 14 has an ultraviolet cutoff filter 34 (actually a red-colored filter) as an observation window for allowing the operator to visually check the remaining length of the light-fixable thermosensitive film F stored in the film loading unit 16.

A platen roller 36 in the form of a rubber roller is mounted on the cover 14 as an auxiliary scanning feed means of the image recording unit 18. The platen roller 36 can be rotated counterclockwise in the direction indicated by the arrow in FIG. 3 by a rotative drive source 38 in the form of a stepping motor mounted on one side of the cover 14 through a gear train 40. A guide roller 41 is also rotatably supported on the cover 14 and has an axis extending parallel to the axis of the platen roller 36. A detector 43 is also attached to the cover 14 for detecting whether there is a light-fixable thermosensitive film F or not.

When the cover 14 is closed on the casing 12, the cover 14 is fixed to the casing 12 by the latch fingers 32, and the platen roller 36 engages a thermal head 42 of the image recording unit 18. As illustrated in FIG. 4, the thermal head 42 comprises an array of several hundred heating elements 44 along a main scanning direction which correspond respectively to pixels to be recorded, the thermal head 42 being secured to a bracket 46. The bracket 46 is swingably supported in the casing 12 by means of a pin 48 mounted on one side of the bracket 46 near the film loading unit 16. A coil spring 50 has one end engaging the lower surface of the bracket 46 and the other end engaging a support plate 52 in the casing 12.

The cutter unit 20 has a first fixed cutter blade 56*a* and a second movable cutter blade 56*b*. The second cutter blade 56*b* is swingable by a disc 60 mounted on the shaft of a rotative drive source 58, a first link 62*a* connected eccentrically to the disc 60, and a second link 62*b* engaging the first link 62*a*, the second cutter blade 56*b* being mounted on the second link 62*b*. The disc 60 has a flat surface 60*a* on its outer circumference which is engaged by a limit switch 64 for detecting the position of the second cutter blade 56*b*.

The image fixing unit 22 includes a pair of ultraviolet lamps 68*a*, 68*b* disposed one on each side of the light-fixable thermosensitive film F in confronting relation to each other, the ultraviolet lamps 68*a*, 68*b* being supported respectively in lamp holders 70*a*, 70*b*. The lamp holders 70*a*, 70*b* are of a curved configuration and have respective inner light reflecting surfaces 72*a*, 72*b* coated with evaporated aluminum layers.

The discharge unit 26 is disposed near in the vicinity of the image fixing unit 22. The discharge unit 26 basically comprises a rubber roller 82 rotatable by a rotative drive source 74 in the form of stepping motor through a gear train 73, and a nip roller 84 held in rolling contact with the rubber roller 82. The nip roller 84 is supported on one end of an arm 86 that is angularly movably disposed in the casing 12, with a coil spring 88 engaging the other end of the arm 86. The nip roller 86 is normally urged in a direction to be held in rolling contact with the rubber roller 82 under the resiliency of the coil spring 88. An attachment plate 90 is disposed above the nip roller 84, and a charge remover brush 92 is mounted on the attachment plate 90, the charge remover brush 92 extending transversely of the light-fixable thermosensitive film F. The tray 24 is detachably mounted in the casing 12 below the rubber roller 82. The tray 24 extends outwardly of the casing 12 through an opening 94 defined in the front panel of the casing 12.

Figure 5:
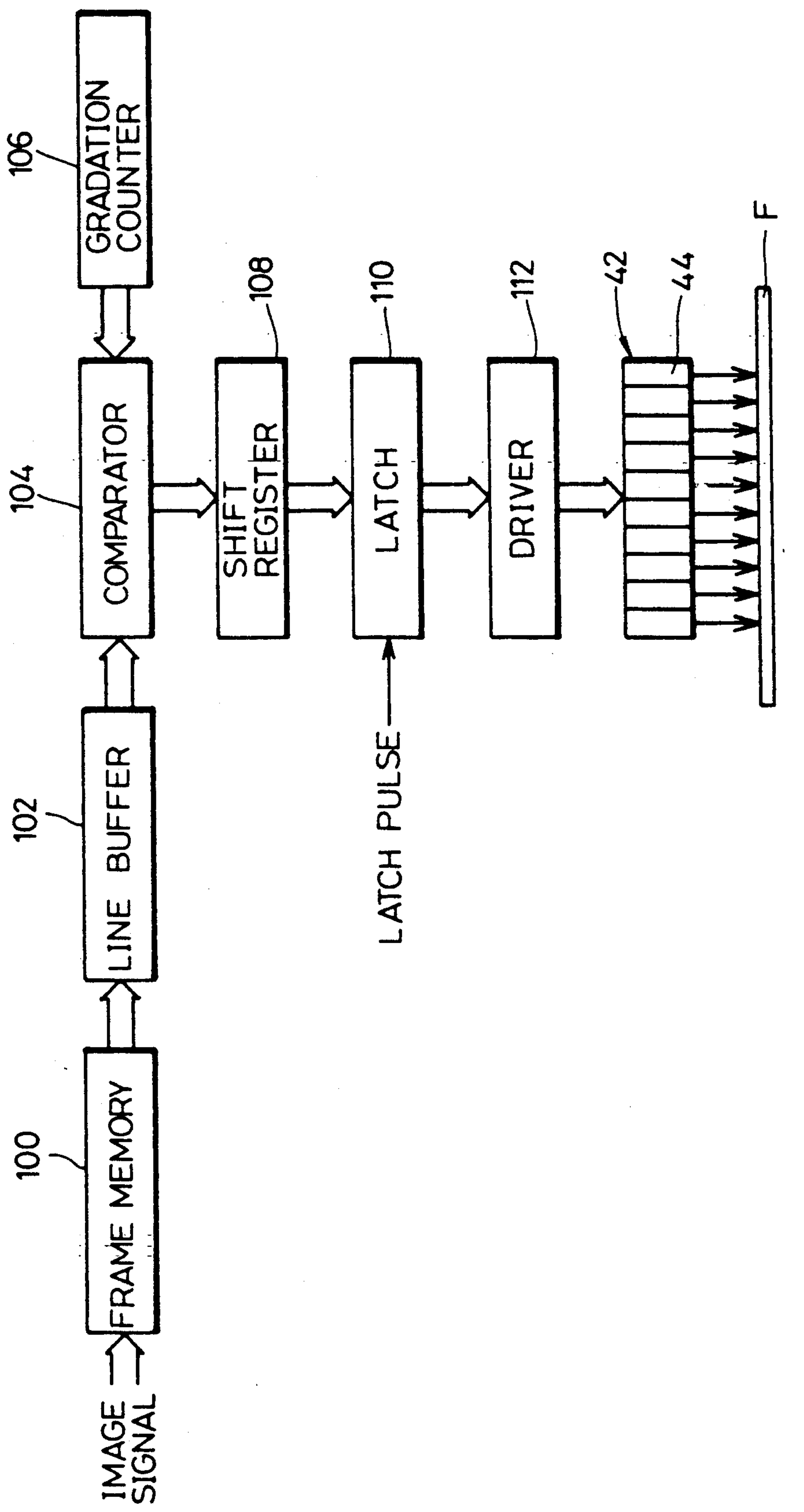
FIG. 5 is a block diagram of a control unit in the thermal printer.

The control unit 28 has a control circuit for controlling the image recording unit 18 as shown in FIG. 5. The control circuit includes a frame memory 100, a line buffer 102, a comparator 104, and a gradation counter 106. The frame memory 100 holds an image signal for each frame which has been supplied from an external source. The line buffer 102 holds an image signal transferred from the frame memory 100 for each main scanning line on the light-fixable thermosensitive film F. The comparator 104 converts an image signal transferred from the line buffer 102 into a gradation signal based on a count signal from the gradation counter 106, and applies the gradation signal to a shift register 108. The shift register 108 transfers the gradation signal to a latch 110 for each main scanning line. The latch 110 supplies the gradation signal to a driver 112 to drive the thermal head 42 based on latch pulses applied at predetermined timing.

Figure 6:
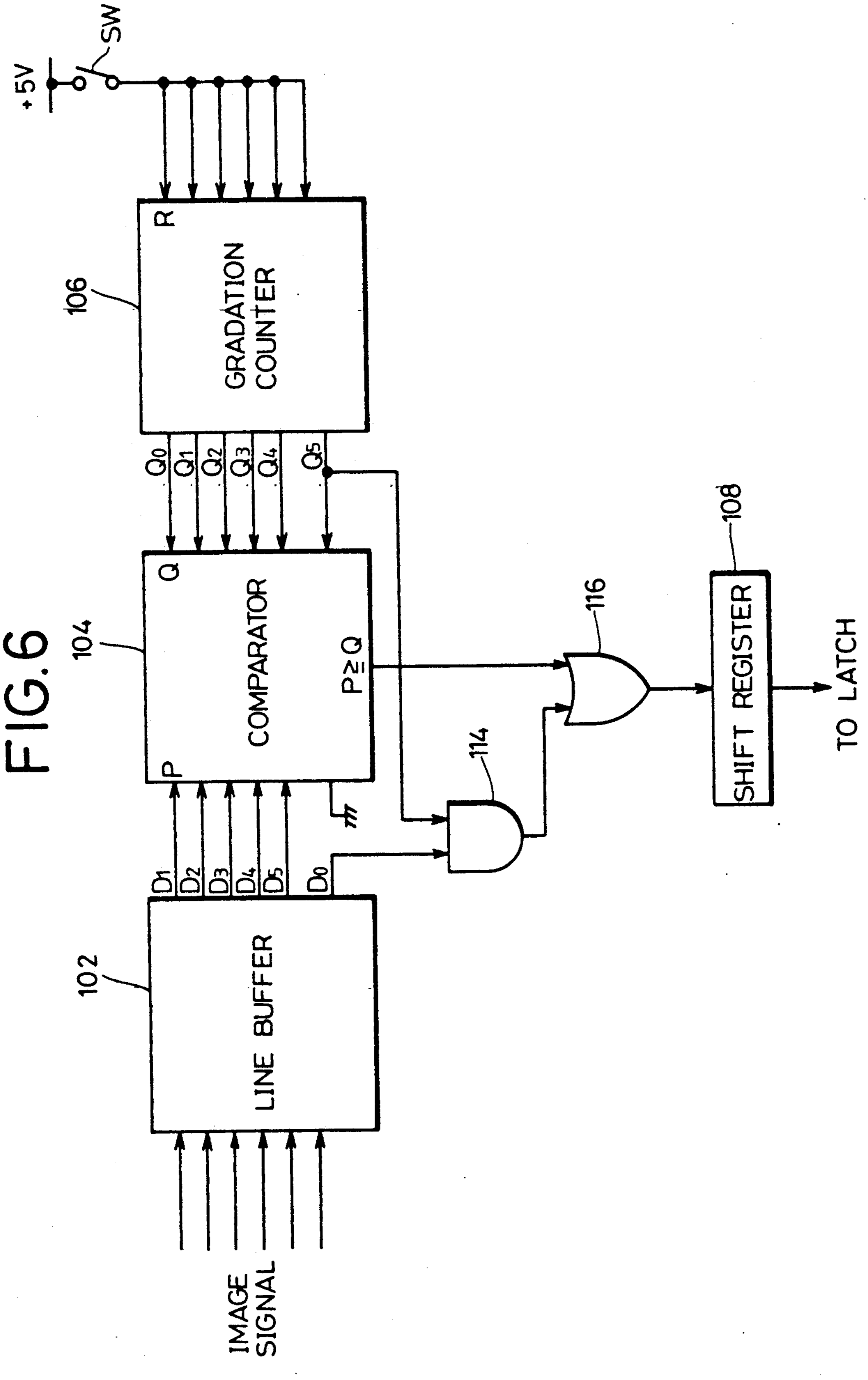
FIG. 6 is a block diagram of a portion of the control unit shown in FIG. 5.

A circuit portion which includes the comparator 104, the line buffer 102, the gradation counter 106, and the shift register 108 is illustrated in detail in FIG. 6. For the sake of brevity, the line buffer 102 and the comparator 104 will be described as processing an image signal for one pixel to be recorded on the light-fixable thermosensitive film F.

The line buffer 102 has data output terminals $D_0$ through $D_5$ for issuing a 6-bit image signal (representing 64 gradations), the data output terminals $D_1$ through $D_5$ being connected to comparison input terminals P of the comparator 104. The comparator 104 has other comparison input terminals Q to which count output terminals $Q_0$ through $Q_5$ of the gradation counter 106 are connected. The gradation counter 106 has preset terminals R to which a constant voltage of +5V is applied through a preset switch SW. The data output terminal $D_0$ for issuing the low-order bit data of the image signal and the count output terminal $Q_5$ for issuing the high-order bit data from the gradation counter 106 are connected to the respective input terminals of an AND gate 114. The comparison output terminal of the comparator 104 and the output terminal of the AND gate 114 are coupled to the respective input terminals of an OR gate 116 which supplies an output signal as a gradation signal to the shift register 108.

The thermal printer in which the gradation signal recording method of the present invention is carried out is basically constructed as described and illustrated. Operation and advantages of the thermal printer will now be described below.

The thermal printer X is connected to a medical image diagnostic apparatus such as an X-ray CT apparatus, an ultrasonic imaging apparatus, or the like. A doctor or other operator observes a monitor of such a medical image diagnostic apparatus, and records a displayed image on the light-fixable thermosensitive film F as a hard copy.

When the grip 30 attached to the cover 14 is gripped and lifted, the latch fingers 32 are turned out of engagement with the casing 12 to unlock the cover 14. The cover 14 is then lifted to its vertical position (FIG. 4), and a rolled light-fixable thermosensitive film F is placed into the film loading unit 16. Then, the leading end of the light-fixable thermosensitive film F is pulled out and inserted between the cutter blades **56*a*, 56*b* of the cutter unit 50, after which the cover 14 is closed. The leading end of the light-fixable thermosensitive film F is sandwiched between the platen roller 36 and the thermal head 42 fixedly mounted on the bracket 46. The detector 43 positioned between the guide roller 41 and the platen roller 36** above the light-fixable thermosensitive film F can now check whether there is a film F or not.

The doctor or the operator operates the operation panel 15 of the thermal printer 10 to enable the control unit 28 to supply a drive signal to the rotative drive source 38. The rotative power of the rotative drive source 38 is transmitted through the gear train 40 to the platen roller 36, which is rotated in the direction indicated by the arrow in FIG. 3 at a speed dependent on an image to be recorded. The light-fixable thermosensitive film F sandwiched between the platen roller 36 and the thermal head 42 is thus fed in an auxiliary scanning direction indicated by the arrow A. At this time, the heating elements 44 of the thermal head 42 are selectively heated dependent on supplied image information to develop a color dimensionally on the light-fixable thermosensitive film F for thereby recording the desired image thereon.

As the image is continuously recorded on the light-fixable thermosensitive film F, the leading end of the film F moves between and past the first and second cutter blades **56*a*, 56*b* of the cutter unit 20 into the image fixing unit 22. In the image fixing unit 22, ultraviolet radiation is applied to both surfaces of the light-fixable thermosensitive film F. Since the ultraviolet radiation emitted from the utraviolet lamps 68*a*, 68*b* is applied directly to the film F and also reflected to the film F by the light reflecting surfaces 72*a*, 72*b* of the lamp holders 70*a*, 70*b***, the image recorded on the light-fixable thermosensitive film F can effectively be fixed thereto.

The light-fixable thermosensitive film F is fed from the image fixing unit 22 toward the discharge unit 26 by the platen roller 36. The leading end of the film F then enters between the nip roller 84 and the rubber roller 82 which is rotated in the direction indicated by the arrow through the gear train 73 by the rotative drive source 74 energized by a given pulse signal. Then, the light-fixable thermosensitive film F while being sandwiched between the rubber roller 82 and the nip roller 84 is delivered past the charge remover brush 92 onto the tray 24.

When the light-fixable thermosensitive film F is fed toward the discharge unit 26 by a predetermined length, the rotative driver source 58 of the cutter unit 20 is energized. The disc 60 is rotated to cause the first and second links **62*a*, 62*b* to swing the second cutter blade 56*b* toward the first cutter blade 56*a*, thus cutting off the light-fixable thermosensitive film F with the first and second cutter blades 56*a*, 56*b*. The operating condition of the first and second cutter blades 56*a*, 56*b* is detected by the limit switch 64 as it engages the flat surface 60*a* of the disc 60. The cut length of the light-fixable thermosensitive film F is then discharged onto the tray 24**.

A method of recording a gradation image with the thermal head 42 of the image recording unit 18 will be described below with reference to the control circuits shown in FIGS. 5 and 6. It is now assumed that the thermal printer 10 is supplied with a 6-bit image signal, i.e., an image signal representing 64 gradations, from a medical image diagnostic apparatus.

An image signal constituting one frame of an image is first stored in the frame memory 100, and then an image signal corresponding to each main scanning line on the light-fixable thermosensitive film F is transferred from the frame memory 100 to the line buffer 102. The image signal transferred to the line buffer 102 is compared with a count signal from the gradation counter 106 by the comparator 104, which then applies a gradation signal to the shift register 108.

More specifically, as shown in FIG. 6, the 6-bit image signal is issued from the data output terminals $D_0$ through $D_5$ of the line buffer 102. The low-order bit data of the image signal from the data output terminal $D_0$ is supplied to one of the input terminals of the AND gate 114, whereas the other bit data of the image signal from the data output terminals $D_1$ through $D_5$ are supplied to the comparison input terminal P of the comparator 104. Before the gradation counter 106 starts to count image gradations, the preset switch SW is turned on to set "1" to the preset terminals R of the gradation counter 106.

Figure 7:
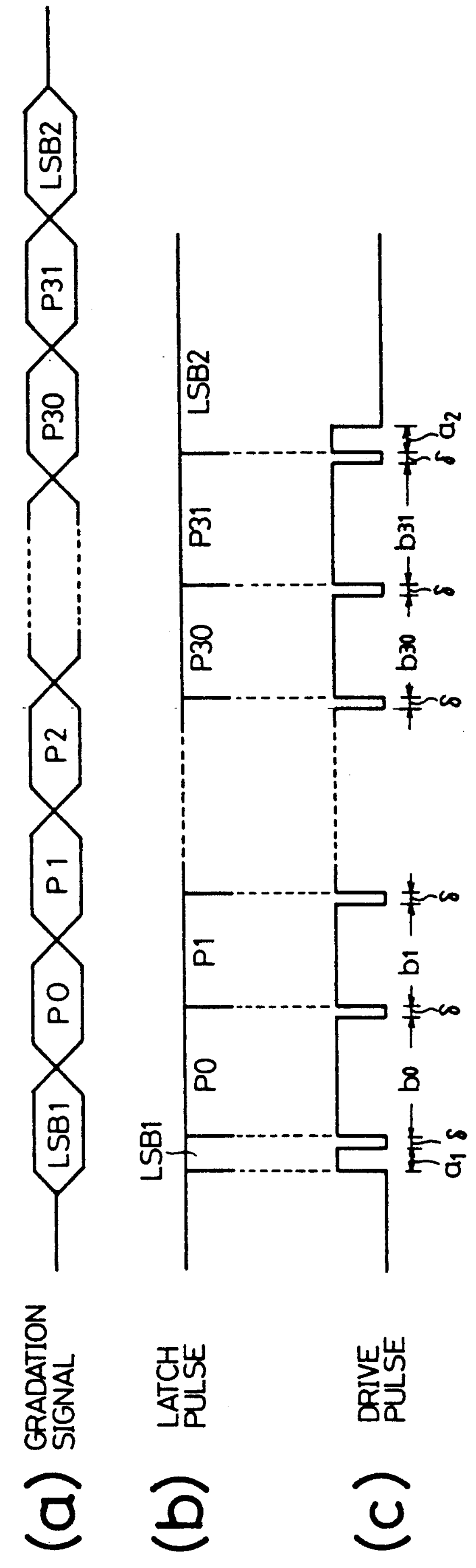
FIG. 7 is a timing chart of signals in the control unit of FIG. 5.

When a trigger signal is applied to the gradation counter 106, the preset switch SW is turned off, and the count output terminals $Q_0$ through $Q_5$ issue a count signal of "1". The high-order bit data of the count signal issued from the count output terminal $Q_5$ is supplied to the other input terminal of the AND gate 114. The count signal issued from the count output terminals $Q_0$ through $Q_5$ is supplied to the comparison input terminals Q of the comparator 104. If the low-order bit data of the image signal from the line buffer 102 is of "1", then a signal of "1" is supplied through the AND gate 114 to the OR gate 116, and the output signal from the comparator 104 is of "0" since $P<Q$. Therefore, the OR gate 116 supplies a gradation signal LSB1 of "1" to the shift register 108 (see FIG. 7 at (a)).

The shift register 108 supplies the latch 110 with the gradation signal LSB1 which is a first unit pulse signal. The latch 110 supplies the driver 112 with a drive pulse having a predetermined time duration $a_1$ (FIG. 7(*c*)) based on a latch pulse (FIG. 7(*b*)) which is supplied at prescribed timing. Therefore, the driver 112 drives a heating element 44 of the thermal head 42 based on the drive pulse. As a result, the light-fixable thermosensitive film F is heated by the heating element 44 for the time period $a_1$ when the low-order bit data of the image signal is of "1", thus developing a color on the film F.

As the gradation counter 106 successively counts up image gradations, the comparator 104 compares the higher-order 5-bit data of the image signal supplied to the comparison input terminals P and the lower-order 5-bit data of the count signal supplied from the gradation counter 106 to the comparison input terminals Q, and issues a signal of "1" from the comparison output terminal to the OR gate 116 until $P<Q$. Since the count output terminal $Q_5$ of the gradation counter 106 is of "0" until the count of the gradation counter 106 reaches "32", the output from the AND gate 114 remains "0" until the count reaches "32". Therefore, the OR gate 116 supplies gradation signals $P_0$, $P_1$, $P_2$, . . . of "1" to the shift register until the signal from the comparison output terminal of the comparator 104 becomes "0" (FIG. 7(*a*)).

The latch 110 supplies the driver 112 with drive pulses having time durations $b_0$, $b_1$, $b_2$, . . . (FIG. 7(*c*)) based on latch pulses (FIG. 7(*b*)) supplied at prescribed timing. In response to the supplied drive pulses, the driver 112 energizes the heating element 44 of the thermal head 42 to cause the light-fixable thermosensitive film M to develop a color thereon.

When the condition of $P<Q$ is reached as a result of the comparison of the signals supplied to the comparison input terminals P, Q of the comparator 104, the output signal from the comparator 104 becomes "0" and is supplied to the OR gate 116. The gradation signal from the OR gate 116 thus becomes "0", whereupon the development of a color on the light-fixable thermosensitive film F with the heat elements 44 is interrupted.

When the counting process of the gradation counter 106 is continued until the count reaches "32", the output signal from the count output terminal $Q_5$ becomes "1". If the low-order bit data of the image signal issued from the data output terminal $D_0$ of the line buffer 102 is of "1" at this time, the output signal from the AND gate 114 becomes "1", and the OR gate 116 issues a gradation signal LSB2 of "1" which is a second unit pulse signal to the shift register (FIG. 7(*a*)). The shift register 108 then supplies the gradation signal LSB2 to the latch 110, which supplies the driver 112 with a drive pulse having a time duration $a_2$ (FIG. 7(*c*)) based on a latch pulse (FIG. 7(*b*)) supplied at prescribed timing. Responsive to the supplied drive pulse, the driver 112 energizes the heating element 44 to heat and develop a color on the light-fixable thermosensitive film F for the time period $a_2$. The other heating elements 44 of the thermal printer 10 are similarly energized at the same time.

In this manner, the light-fixable thermosensitive film F is heated to develop a color along one main scanning line. Then, an image signal for a next scanning line is transferred to the comparator 104 to heat and develop a color on the light-fixable thermosensitive film F again. As a result, a two-dimensional image is recorded on the light-fixable thermosensitive film F.

The comparator 104 converts the higher-order 5-bit data of a 6-bit image signal supplied from the line buffer 102 into a gradation signal based on a count signal from the gradation counter 106, and applies the gradation signal to the shift register 108. If an image were formed by employing only the gradation signal, up to only 32 gradations would be produced. According to the embodiment of the present invention, however, the low-order bit data from the data output terminal $D_0$ of the line buffer 102 is checked for parity to produce gradation signals LSB1, LSB2 which are employed to form an image composed of densities represented by 64 gradations.

More specifically, the time durations $b_0$ through $b_{31}$ of drive pulses based on gradation signals $P_0$ through $P_{31}$ are set such that an image density formed by each drive pulse covers two gradations out of 64 gradations by adjusting the timing of a latch pulse. Therefore, an image having 32 density gradations can be formed by the gradation signals $P_0$ through $P_{31}$. The sum $(a_1+a_2)$ of the time durations $a_1$, $a_2$ of the drive pulses based on the gradation signals LSB1, LSB2 is selected such that an image density produced by these drive pulses covers one gradation of 64 gradations. If an even-numbered gradation density is to be expressed, then the gradation signals LSB1, LSB2 are set to "0". If an odd-numbered gradation density is to be expressed, then the gradation signals LSB1, LSB2 are set to "1". By employing the gradation signals $P_0$ through $P_{31}$, LSB1, LSB2, therefore, an image with 32 gradations can be interpolated to produce an image with 64 gradations.

With the recording method of the present invention, since an image with 64 gradations can be recorded on the light-fixable thermosensitive film F by 34 drive pulses, the sum of idle times $\delta$ produced between drive pulses when the signals are transferred is reduced to about ½ of the sum of idle times which would be produced if an image were recorded with 64 drive pulses. As a result, an image can be recorded at a high speed according to the present invention. Since any loss time in recording an image is reduced, a reduction in the temperature of the thermal head 42 is minimized and the efficiency of color development on the film F is increased.

Figure 8:
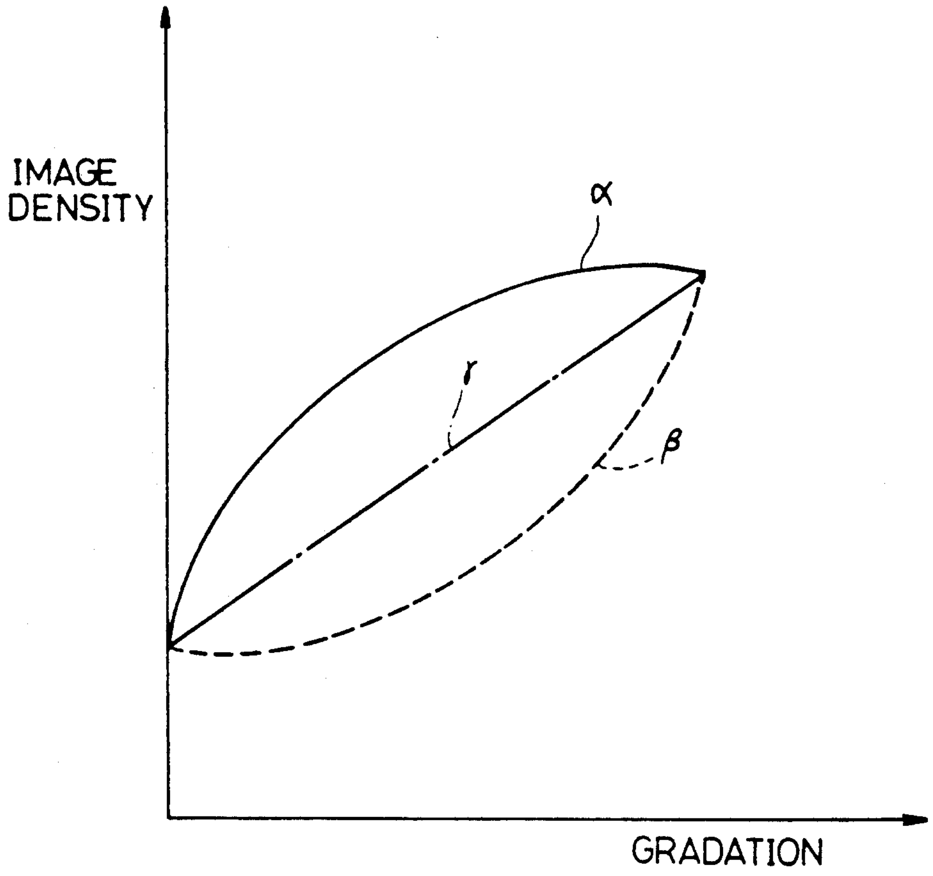
FIG. 8 is a graph illustrating the relationship between gradations and image densities produced according to the method of the present invention.

The light-fixable thermosensitive film F has characteristics such that the image density varies at a small rate with the amount of thermal energy applied thereto in both low and high energy regions. According to the present invention, desired gradation vs. density characteristics can be obtained as shown in FIG. 8 by adjusting the time durations $a_1$, $a_2$ of the gradation signals LSB1, LSB2 added before and after the gradation signals $P_0$ through $P_{31}$. More specifically, a gradation vs. density characteristic curve $\alpha$ can be obtained by increasing the time duration $a_1$ of the drive pulse produced by the gradation signal LSB1 so as to be longer than the time duration $a_2$ of the drive pulse produced by the gradation signal LSB2. A gradation vs. density characteristic curve $\beta$ can be obtained by making the time duration $a_1$ shorter than the time duration $a_2$. A gradation vs. density characteristic curve $\gamma$ can be produced by equalizing the time durations $a_1$, $a_2$ with each other. By suitably adjusting the time durations $a_1$, $a_2$ of the drive pulses, a desired gradation vs. density characteristic curve can be obtained between the curves $\alpha$, $\beta$.

With the present invention, as described above, a gradation image is recorded on a thermosensitive medium by heating elements by driving the heating elements with pulse signals each corresponding to one gradation and pulse signals each corresponding to plural gradations. Such plural gradations are recorded by a single pulse signal and the interval between plural gradations is interpolated by the pulse signals each corresponding to one gradation. Therefore, an image of many gradations can be recorded in a short period of time. Since the time in which the heating elements remain de-energized between pulse signals is shortened, any reduction in the temperature of the heating elements in such de-energization time is held to a minimum, and the efficiency of color development on the thermosensitive medium is increased. Desired image density characteristics can be obtained by adjusting the time durations of pulse signals each corresponding to one gradation which are added before and after pulse signals each corresponding to plural gradations.

Although certain preferred embodiment has been shown and described, it should be understood that many changes and modifications may be made therein without departing from the scope of the appended claims.

What is claimed is:

1. A method of recording a gradation image on a thermosensitive medium in a thermal printer with heating elements by using recording pulse signals, each of said recording pulse signals including an idle-time portion, comprising the steps of:

generating first recording pulse signals, each for forming a one-gradation image, and second recording pulse signals each for forming a plural-gradation image from an image signal; and energizing the heating elements with said first and second recording pulse signals which are combined together to record said gradation image with said one-gradation image as a minimum density unit thereof, thereby minimizing the sum of idle-time portions between adjacent recording pulse signals.

2. A method according to claim 1, wherein said first recording pulse signals include a first unit pulse signal and a second unit pulse signal, said method further comprising the steps of:

energizing said heating elements with said first unit pulse signal;

then energizing said heating elements with said second recording pulse signals; and thereafter energizing said heating elements with said second unit pulse signal.

3. A method according to claim 2, further comprising the step of:

adjusting the time duration of said second unit pulse signal with respect to the time duration of said first unit pulse signal to adjust the density of the gradation image recorded on said thermosensitive medium.

4. A method according to claim 1, wherein said first recording pulse signals are generated based on low-order bit data of the image signal.

5. A method according to claim 1, wherein said second recording pulse signals are generated based on other bit data than low-order bit data of the image signal.

6. A method of recording a gradation image on a thermosensitive medium in a thermal printer with heating elements, comprising the steps of:

generating first pulse signals each for forming a one-gradation image, said first pulse signals each including a first unit pulse signal and a second unit pulse signal;

generating second pulse signals each for forming a plural-gradation image from an image signal;

energizing said heating elements with said first and second pulse signals which are combined together to record said gradation image with said one-gradation image as a minimum density unit thereof;

wherein the step of energizing said hating elements further comprises:

energizing said hating elements with said first unit pulse signal;

then energizing said heating elements with said second pulse signals;

thereafter energizing said heating elements with said second unit pulse signal.

7. A method according to claim 6, further comprising the step of:

adjusting the time duration of said second unit pulse signal with respect to the time duration of said first unit pulse signal to adjust the density of the gradation image recorded on said thermosensitive medium.

8. A method according to claim 6, wherein said first pulse signals are generated based on low-order bit data of the image signal.

9. A method according to claim 6, wherein said first pulse signals are generated based on other bit data than low-order bit data of the image signal.

* * * * *